US006622139B1

United States Patent
Nakayama et al.

(10) Patent No.: US 6,622,139 B1
(45) Date of Patent: Sep. 16, 2003

(54) INFORMATION RETRIEVAL APPARATUS AND COMPUTER-READABLE RECORDING MEDIUM HAVING INFORMATION RETRIEVAL PROGRAM RECORDED THEREIN

(75) Inventors: Takehiro Nakayama, Nakai-machi (JP); Hiroki Kato, Nakai-machi (JP); Hidetaka Miyake, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/377,057

(22) Filed: Aug. 19, 1999

(30) Foreign Application Priority Data

Sep. 10, 1998 (JP) .......................................... 10-256145

(51) Int. Cl.[7] .............................................. G06F 17/30
(52) U.S. Cl. ............................................. 707/3; 707/10
(58) Field of Search ................................. 707/1, 2, 3, 4, 707/5, 6, 10, 100, 101, 103; 704/9

(56) References Cited

U.S. PATENT DOCUMENTS 5,526,443 A     6/1996 Nakayama ................... 382/229
6,233,571 B1 *  5/2001 Egger et al. .................... 707/3

OTHER PUBLICATIONS

Paul S. Jacobs "Third Conference on Applied Natural Language Processing" "Joining Statistics with NLP for Text Categorization" pp. 178–185, Mar.–Apr. 3, 1992.

Gerard Salton et al. "Third Annual Symposium on Document Analysis and Information Retrieval" "Text Retrieval Using the Vector Processing Model" pp. 9–21, Apr. 11–13, 1994.

\* cited by examiner

Primary Examiner—Diane D. Mizrahi
(74) Attorney, Agent, or Firm—Oliff & Berridge, PLC

(57) ABSTRACT

In retrieval in which information having meaningful consistence is regarded as one unit, useful information within a hypertext structure retrieved is rendered capable of being effectively perused. A node group constituting part constitutes node groups to be retrieved on the basis of combination through links and the degree of similarity in contents from information in a hyper-document system. A component node storing part stores node group identification address information sent from the node group constituting part. When a retrieval request is given, an information retrieval part calculates the degree of similarity between the retrieval request and the node group. A similarity calculation part acquires the component nodes of a node group similar to the retrieval request from the component node storing part, and calculates the degrees of similarity between the component nodes acquired and the retrieval condition profile to rank the component nodes. A similarity retrieval result display part displays access paths to each component node in such a manner that component nodes having a high ordinal rank in the degree of similarity can be distinguished.

7 Claims, 14 Drawing Sheets

INFORMATION RETRIEVAL APPARATUS AND COMPUTER-READABLE RECORDING MEDIUM HAVING INFORMATION RETRIEVAL PROGRAM RECORDED THEREIN

BACKGROUND OF THE INVENTION

1. Technical Field of the Invention

The present invention relates to an information retrieval apparatus for retrieving information from a hyper-document system composed of links between nodes, and a medium having an information retrieval program for constructing the information retrieval apparatus in a computer recorded therein, and more particularly to an information retrieval apparatus for retrieving information with node groups having definite meaningful consistence as a retrieval object, and a computer-readable recording medium having the information retrieval program recorded therein.

2. Related Art

A hyper-document system (system described in, for example, HTML (Hyper Text Markup Language)) having no restraint in the meaning in the links between nodes has an advantage that the document author can determine the contents and link structure at will. Also, the document reader can obtain access to a multiplicity of documents prepared by a multiplicity of document readers through the use of a computer network (for example, World Wide Web).

As a related art for supporting the document reader to retrieve his/her desired information from such a hyper-document system, there are the following two ones:

A first related art is a technique in which retrieval indexes for each node are prepared in advance by scanning nodes of as large a quantity as possible (at random) and an index which matches a query (combination of key words) from the document reader is presented (for example, AltaVista, http://altavista.digital.com/). In this respect, as constituent technologies for implementing this technique, a vector space model (G. Salton & J. Allan, Text Retrieval Using the Vector Processing Model, in Proc. of SDAIR94) which is a statistical language processing technique, has been devised in the creation of the retrieval indexes and matching with queries.

A second related art is a technique in which nodes of as large a quantity as possible are scanned (at random) in advance to be allocated to a directory having tree structure which has been classified by topics. The document reader looks for a topic in which the desired information is considered to be contained from the directory to obtain access to the information (for example, Yahoo, http://www.yahoo.com/) aimed at. In this respect, as constituent technologies to implement this technique, there has been proposed automatic document classification technique (for example, P. Jacobs, Joining Statistics with NLP for Text Categorization, in Proc. of Applied-ACL92) to which the natural language processing has been applied. Further, there has also been devised automatic document classification technique (U.S. Pat. No. 5,526,443, T. Nakayama (Fuji Xerox), Method and apparatus for highlighting and categorizing documents using coded word tokens, issue date: 1996.6.11) in which the media have been expanded into images. Problems to be solved by the Invention In these two related arts, however, since one node is regarded as one retrieval object unit, the essence of the hyper-document system in which a concept is expressed with a structure consisting of nodes and links cannot be grasped, and the following problems have been pointed out.

The first problem is that although it depends upon the taste of the document author into how many nodes a certain piece of information is divided and into what structure they are built up, node groups built up on a hyper network cannot be grasped on the whole as information having meaningful consistence by such retrieval that nodes are regarded as one unit. In other words, in the retrieval based on the related art, only pieces of information which are imperfect in terms of meaning are to be retrieved, and the context cannot be reflected in the retrieval.

The second problem is that a concept representing a retrieval request cannot be expressed in the structure on the hyper network.

In order to solve these problems, it is necessary to change the retrieval in which nodes are regarded as one unit, and to perform the retrieval in which information having meaningful consistence is regarded as one unit. Such retrieval could be implemented if a feature of a certain starting point node is compared with a feature of an N-order node (N=2, 3, . . .) linked from the starting point node to determine their similarity, and N-order nodes which are determined to be similar are merged with the starting point node. The present applicant has applied for patent (Japanese Published Unexamined Patent Application No. Hei 09-153387) for the invention concerning such an information retrieval apparatus.

This technique enables the document reader to retrieve the desired hyper-structure. In other words, the document reader can acquire useful information by browsing the hyper-structure presented by the retrieval apparatus.

Generally, however, a browsing path has a plurality of branches, and it is not known which links should be transited in order to effectively acquire useful information. For this reason, the document reader actually must depend on trial-and-error methods on selecting those branches while understanding the contents of the nodes which he/she is currently reading. Perusal using such trial-and-error methods is not efficient, but it takes more time than necessary to acquire the desired information.

SUMMARY OF THE INVENTION

The present invention has been achieved in the light of the above-described points, and is aimed to provide an information retrieval apparatus capable of effectively perusing useful information within the hyper-text structure retrieved in the retrieval in which information having meaningful consistence is regarded as one unit.

Also, it is another object of the present invention to provide a computer-readable recording medium having an information retrieval program recorded therein, the information retrieval program being capable of causing a computer to execute such a process as to perform the retrieval in which information having meaningful consistence is regarded as one unit, and to allow useful information within the hyper-text structure retrieved to be effectively perused.

As a first information retrieval apparatus according to the present invention for solving the above-described problems, there is provided an information retrieval apparatus for retrieving a hyper-document system composed of links between nodes, which are units of information, comprising: a node group constituting part for constituting node groups consisting of nodes, which are combined through links and are similar in contents, aiming at the nodes in the hyper-document system; a component node storing part for storing component nodes which constitute the node groups; an information retrieval part for retrieving, when a retrieval request is inputted, similar node groups having a high degree of similarity which meet the retrieval request in a plurality of the node groups; a similarity calculation part for calculating degrees of similarity between the component nodes stored in the component node storing part and the retrieval request concerning the similar node groups returned as a candidate as a result of the retrieval by the information retrieval part; and a similarity retrieval result displaying part for displaying paths for accessing each component node in the similar node groups in such a manner that component nodes having a high degree of similarity to the retrieval request can be distinguished.

According to such an information retrieval apparatus, node groups consisting of nodes, which are combined through links and are similar in contents among the nodes in the hyper-document system are constituted by the node group constituting part. Then, component nodes, which constitute node groups, are stored by the component node storing part. Thereafter, when a retrieval request is inputted, similar node groups having high degrees of similarity to the retrieval request among a plurality of node groups are retrieved by the information retrieval part. Next, concerning the similar node groups returned as a candidate as a result of the retrieval by the information retrieval part, degrees of similarity between the component nodes stored in the component node storing part and the retrieval request are calculated by the similarity calculation part. Thus, paths for accessing each component node in the similar node groups are displayed by the similarity retrieval result displaying part in such a manner that component nodes having high degrees of similarity to the retrieval request can be distinguished.

Also, as a second information retrieval apparatus according to the present invention, there is provided an information retrieval apparatus for retrieving a hyper-document system composed of links between nodes, which are units of information, comprising: an inter-node similarity calculation part for calculating inter-node degrees of similarity between nodes which are directly referred to by the links; a retrieval request similarity calculation part for calculating, when a retrieval request is inputted, degrees of similarity in retrieval request between the retrieval request and the nodes contained in the hyper-document system; a link weight calculation part for calculating the link weight between the nodes on the basis of the degree of similarity in retrieval request and the inter-node degrees of similarity; and a dynamic node group constituting part for constituting the node groups connected with one another by the link weight equal to or higher than a threshold set in advance on the basis of the link weight.

According to such an information retrieval apparatus, the inter-node degrees of similarity between the nodes to which are directly referred by the links are first calculated by the inter-node similarity calculation part. Thereafter, when a retrieval request is inputted, the degrees of similarity in retrieval request between the retrieval request and the nodes contained in the hyper-document system are calculated by the retrieval request similarity calculation part. Then, the link weight between the nodes is calculated by the link weight calculation part on the basis of the degree of similarity in retrieval request and the inter-node degree of similarity. Thus, the node groups are constituted by the nodes connected with one another by the link weight equal to or higher than a threshold set in advance on the basis of the link weight by the dynamic node group constituting part.

Also, as a computer-readable recording medium having the first information retrieval program according to the present invention recorded therein, there is provided a computer readable recording medium having an information retrieval program recorded therein, the information retrieval program retrieving a hyper-document system constituted by links between nodes, which are units of information, comprising: a node group constituting part for constituting node groups consisting of nodes, which are combined through links and are similar in contents, aiming at the nodes in the hyper-document system; a component node storing part for storing component nodes which constitute the node groups; an information retrieval part for retrieving, when a retrieval request is inputted, similar node groups having high degrees of similarity which meet the retrieval request among a plurality of the node groups; a similarity calculation part for calculating degrees of similarity between the component nodes stored in the component node storing part and the retrieval request concerning the similar node groups returned by the information retrieval part as a candidate as a result of the retrieval; and a similarity retrieval result displaying part displaying paths for accessing each component node in the similar node groups in such a manner that component nodes having high degrees of similarity to the retrieval request can be distinguished.

If an information retrieval program recorded in such a recording medium is caused to be executed by a computer, necessary functions for the first information retrieval apparatus according to the present invention will be constructed on the computer.

Also, as a computer-readable recording medium having the second information retrieval program according to the present invention recorded therein, there is provided a computer-readable recording medium having an information retrieval program recorded therein, the information retrieval program for retrieving a hyper-document system constituted by links between nodes, which are units of information, comprising: an inter-node similarity calculation part for calculating degrees of similarity between nodes, which are directly referred to by the links; a retrieval request similarity calculation part for calculating, when a retrieval request is inputted, degrees of similarity in retrieval request between the retrieval request and the nodes contained in the hyper-document system; a link weight calculation part for calculating the link weight between the nodes on the basis of the degree of similarity in retrieval request and the inter-node degrees of similarity; and a dynamic node group constituting part for constituting the node groups by nodes connected with one another by the link weight equal to or higher than a threshold set in advance on the basis of the link weight.

If an information retrieval program recorded in such a recording medium is caused to be executed by a computer, necessary functions for the second information retrieval apparatus according to the present invention will be constructed on the computer.

DETAILED DESCRIPTION OF PREFERRED EMBODIMENT

Embodiments of the Invention

Hereinafter, with reference to the drawings, the description will be made of embodiments according to the present invention.

Figure 1:
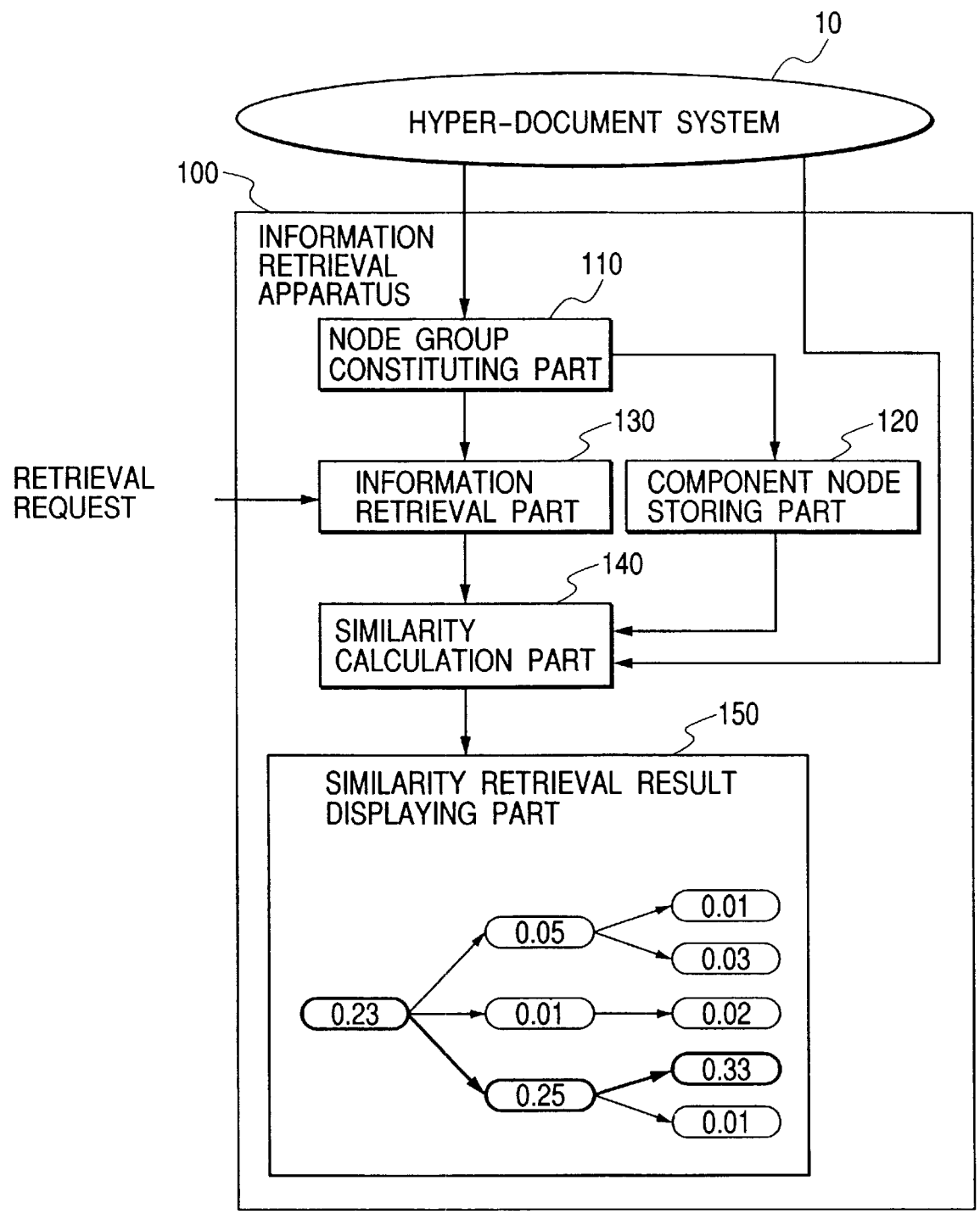
FIG. 1 is a view showing the structure of a first embodiment of information retrieval apparatus according to the present invention.

FIG. 1 is a view showing the structure of a first embodiment of information retrieval apparatus according to the present invention. An information retrieval apparatus 100 according to the present invention is composed of: a node group constituting part 110, a component node storing part 120, an information retrieval part 130, a similarity calculation part 140 and a similarity retrieval result displaying part 150. The functions of these components will be described below.

The node group constituting part 110 constitutes node groups to be retrieved on the basis of combination through links and degrees of similarity in contents from information dispersedly arranged in the hyper-document system 10. More specifically, a node obtained by scanning a certain node existing in the hyper-document 10 at random is set to a starting point node. Next, a set of nodes, which can be reached by following links from the starting point node, and which have contents similar to the starting point node is determined to constitute a node group. A profile (hereinafter, referred to as "retrieval object profile") indicating features of the contents of the node group thus constituted is generated, and is held by relating it to the identification address of the starting point node. Hereinafter, the node group generated can be specified by the identification address of the starting point node. In this respect, the identification address here means an absolute address uniquely given to the node, and indicates URL (Uniform Resource Locator) in the case of, for example, World Wide Web.

Also, the node group constituting part 110 sends, to the component node storing part 120, node group identification address information comprising the identification address of the starting point node and identification addresses for each node which constitutes the node group generated combined together with one another as a set respectively.

The component node storing part 120 stores node group identification address information sent from the node group constituting part 110.

When a retrieval request (expressed in a keyword train, text or a hyper-structure) is given, the information retrieval part 130 generates a profile (hereinafter, referred to as "retrieval request profile") representing the features of the contents of the retrieval request. Concretely, it analyzes the contents of the retrieval request, and extracts a pair of set consisting of words by which the contents of the retrieval request are characterized, and values indicating their importance to constitute the retrieval request profile. Thus, it calculates a degree of similarity between each retrieval object profile held by the node group constituting part 110 and the retrieval request profile. If the degrees of similarity between all node groups and the retrieval object profile have been obtained, starting point node identification addresses for the node groups, which have been sequenced in accordance with the magnitude of degree of similarity, are used as the retrieval result. The retrieval result and the retrieval request profile are supplied to the similarity calculation part 140. In this case, only node groups having degrees of similarity equal to or higher than a certain threshold may be narrowed down as candidates for retrieval result. In this respect, a known vector inner product operation method is used for calculation of the degree of similarity.

The similarity calculation part 140 acquires a component node corresponding to the starting point node identification address given as the retrieval result from the component node storing part 120, and further acquires the contents of all component nodes from the hyper-document system 10. Thus, it calculates the degree of similarity between the component node acquired and the retrieval condition profile to rank the component nodes. The node groups which have been ranked on the basis of the degree of similarity are supplied to the similarity retrieval result displaying part 150.

The similarity retrieval result displaying part 150 displays paths for accessing each node constituting the node groups obtained by the similarity calculation part 140 in such a manner that component nodes having high degrees of similarity to the retrieval request can be distinguished. This enables the user to recognize which component nodes are more similar to the retrieval condition among node groups similar to the retrieval condition. For example, the node groups are represented by a tree structure with the starting point node as a root, and a value of degree of similarity is indicated to each node. At this time, a path from the starting point node to a node having the highest degree of similarity is highlighted. In the example shown in the figure, the node having a degree of similarity of "0.33" has the highest degree of similarity. Since there is a high possibility that a node having a high degree of similarity contains useful information for the user, the user can effectively acquire useful information by giving priority to these nodes for browsing.

Hereinafter, the detailed description will be made of each component of an information retrieval apparatus according to the present invention.

Figure 2:
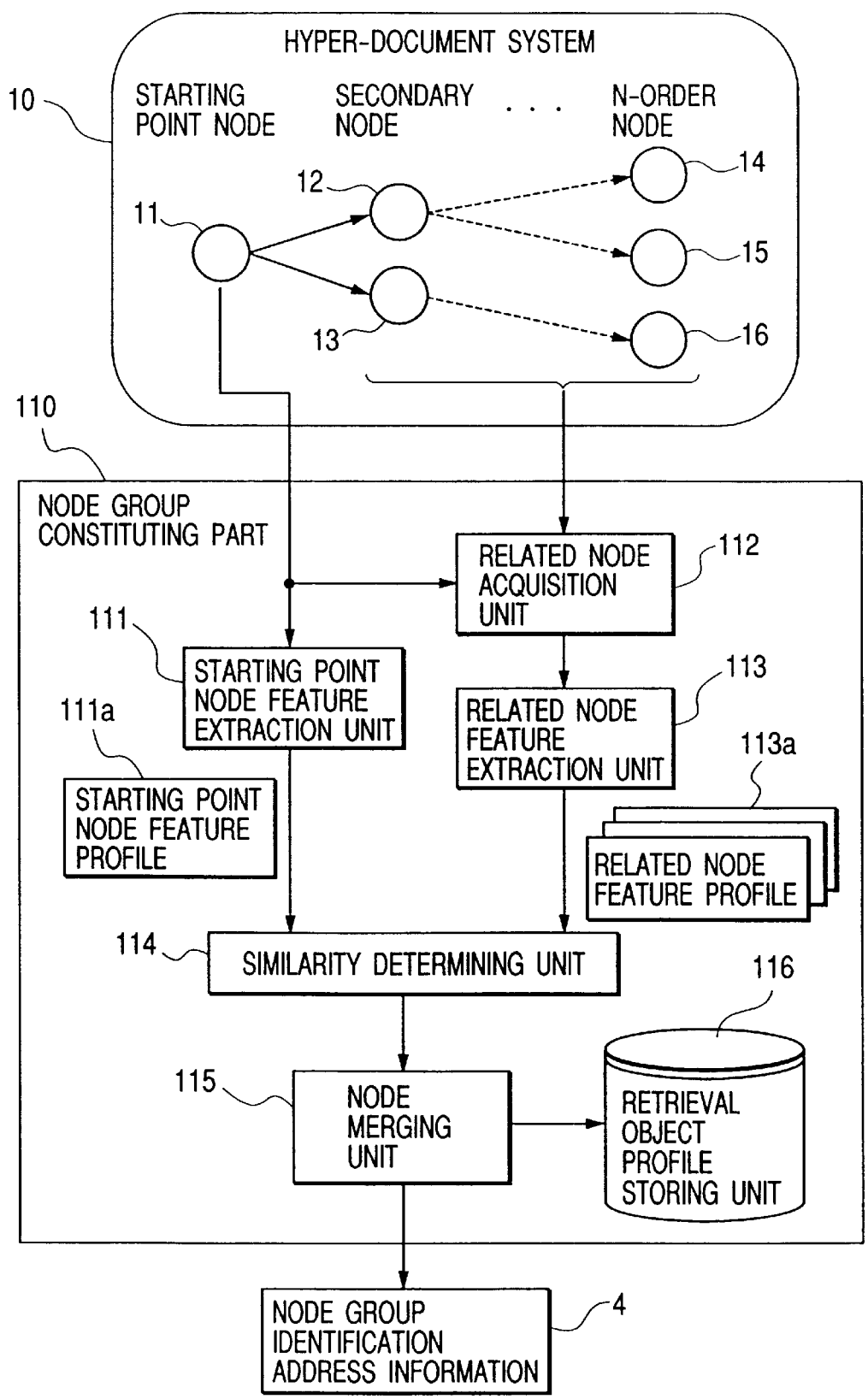
FIG. 2 is a view showing the internal structure of a node group constituting part.

FIG. 2 is a view showing the internal structure of the node group constituting part. This node group constituting part 110 is composed of the following elements:

When a starting point node is inputted, the starting point node feature extraction unit 111 analyzes the contents of the starting point node to extract the feature of the starting point node. The feature extracted is supplied to the similarity determining unit 114 as a starting point node feature profile 111*a*. Information on the feature of a node means a pair of set consisting of a word by which the contents of the node are characterized, and a value indicating its importance. The weighting is effected on, for example, each word appearing at the starting point node on the basis of information concerning their frequencies of appearance, positions of appearance, and parts of speech to thereby prepare a starting point node feature profile 111*a*.

When a starting point node 11 is inputted, the related node acquisition unit 112 acquires secondary nodes 12 and 13 to which links are stretched from the node 11, and acquires nodes (related nodes) in order, to which links are further stretched from the nodes thus acquired. Thus, this operation will be performed until there are no longer links to other nodes. Alternatively, the depth (=value of N) of a link may be determined in advance and set so as not to exceed it. Each node 14 to 16 following secondary nodes 12 and 13 which are acquired at this time is set to an N-order node (N=3, 4 . . . ).

The related node feature extraction unit 113 extracts the features of each of the secondary to N-order nodes extracted by the related node acquisition unit 112 to prepare a related node feature profile 113*a*. The related node feature extraction unit 113 also can prepare, as in the case of the starting point node feature extraction unit 111, a related node feature profile 113*a* by effecting weighting on the basis of information on the frequencies of appearance, positions of appearance, and parts of speech concerning each word appearing at the related node. The related node feature profile thus prepared is supplied to the similarity determining unit 114.

The similarity determining unit 114 judges the similarity of all nodes accessible by following the links from the starting point node, or all nodes accessible up to a predetermined depth (=N) to the starting point node on the basis of the related node feature profile prepared by the related node feature extraction unit 113. The contents of the similar nodes are supplied to the node merging unit 115.

The node merging unit 115 merges a related node feature profile 113*a* of nodes, which have been determined by the similarity determining unit 114 to be similar, with the starting point node feature profile 111*a*. The profile thus merged is stored in a retrieval object profile storing unit 116 as a retrieval object profile by relating to the identification address for starting point node. Also, the identification address information for component nodes contained in the node groups which have been judged to be similar is stored in a component node storing part 120 by bringing it into correspondence with the starting point node identification address.

The retrieval object profile storing unit 116 holds a set consisting of the identification address for the starting point node and the retrieval object profile, and supplies the information held thereby on a request from the information retrieval part 130.

The detail of the process performed by the node group constituting part 110 having such a structure will be described below.

First, a generation process of the node group will be described.

Figure 3:
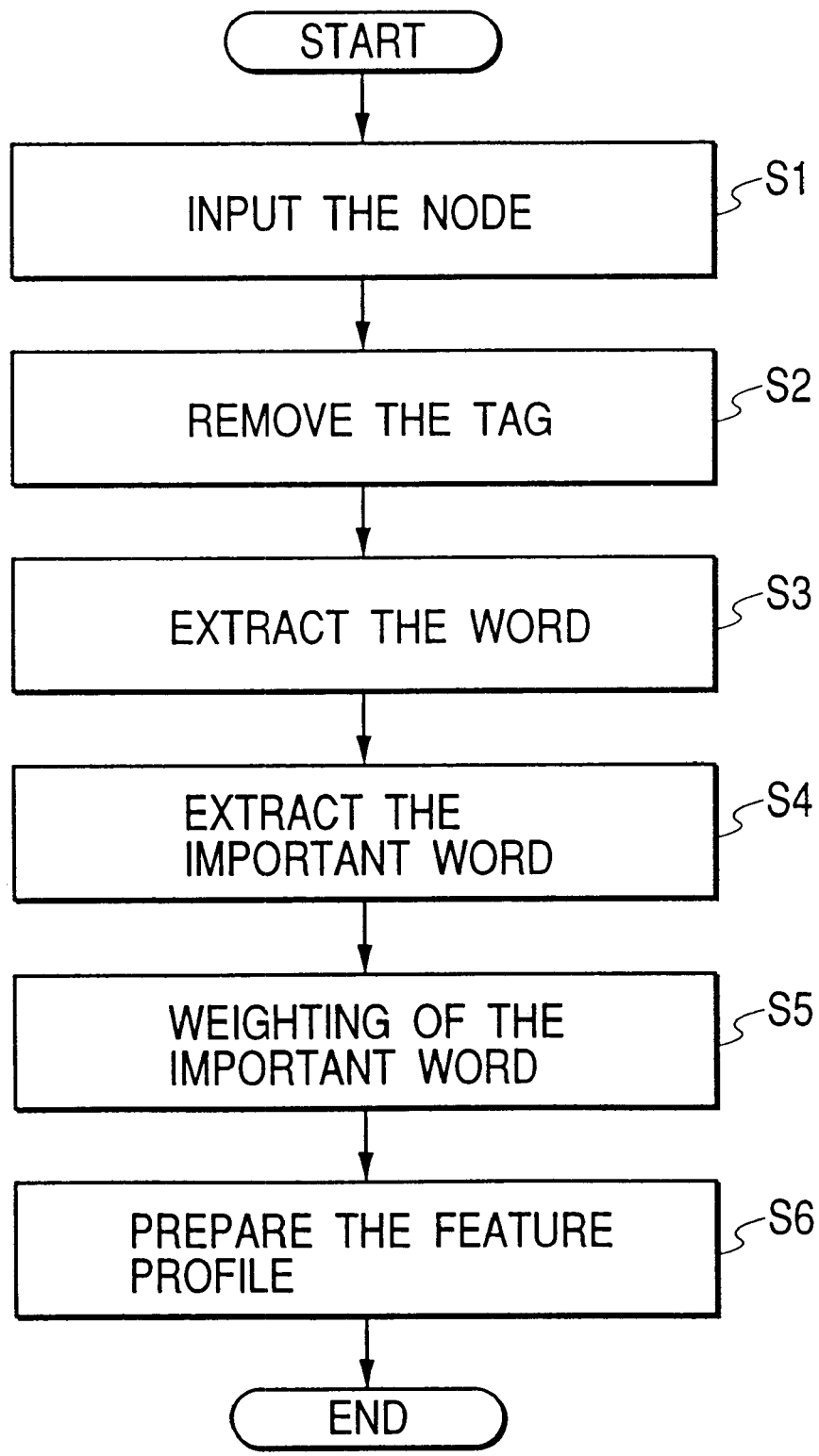
FIG. 3 is a flow-chart showing the flow of a feature extracting process.

FIG. 3 is a flow-chart showing a flow of a feature extracting process. In this flow-chart, the description will be made as a process of the starting point node feature extraction unit 111 which has received a starting point node, and a related node feature profile generating process performed by the related node feature extraction unit 113, a retrieval request profile generating process performed by the information retrieval part 130, and a process performed by the similarity calculation part 140 are also similar processes. Hereinafter, each process will be described along step numbers.

[S1] A starting point node is given, and its information source is inputted into the starting point node feature extraction unit 111.

[S2] The tag defined in a hyper-document system description language (for example, HTML) is removed from the information source.

[S3] Words are extracted from the text left using a known morpheme analysis technique.

[S4] Only important words are extracted from a set of words obtained in the step S3. The important words here mean words by which the contents of the information source are characterized, and they are extracted by, for example, a method of regarding only nouns as important words.

[S5] The weighting is effected on the important words obtained in the step S4 in consideration of the frequency in appearance and position of appearance. In other words, a word of the higher frequency in appearance is raised higher in importance. Also, the closer the position of appearance is to the head of the document, the higher the word is raised in importance.

[S6] Finally, a list of sets, each consisting of an important word and its weight, is prepared, and this list is used as the starting point node feature profile 111*a*.

A starting point node feature profile 111*a* 1 thus obtained is supplied to the similarity determining unit 114.

Also, the starting point node 11 is supplied to the related node acquisition unit 112, and the related node acquisition unit 112 retrieves the link information contained in the information source of the starting point node 11 thus received, and acquires the nodes beyond the link as secondary nodes 12 and 13. If the starting point node 11 is prepared in accordance with, for example, HTML, URL within an area encircled by anchor tags (<A>. . . </A>) is extracted, and the document (secondary node) designated by the URL is acquired.

A set of related nodes acquired by the related node acquisition unit 112 is supplied to the related node feature extraction unit 113. A similar process to the flow-chart shown in FIG. 3 is executed by the related node feature extraction unit 113, and a related node feature profile 113*a* for each related node is prepared. The feature profiles 113*a* for the related node are supplied to the similarity determining unit 114. Accordingly, the starting point node feature profile 111*a* and the plurality of related node feature profiles 113*a* are to be supplied to the similarity determining unit 114.

Next, the description will be made of a concrete example of the flow of a process to be executed in the similarity determining unit 114 of FIG. 2.

Figure 4:
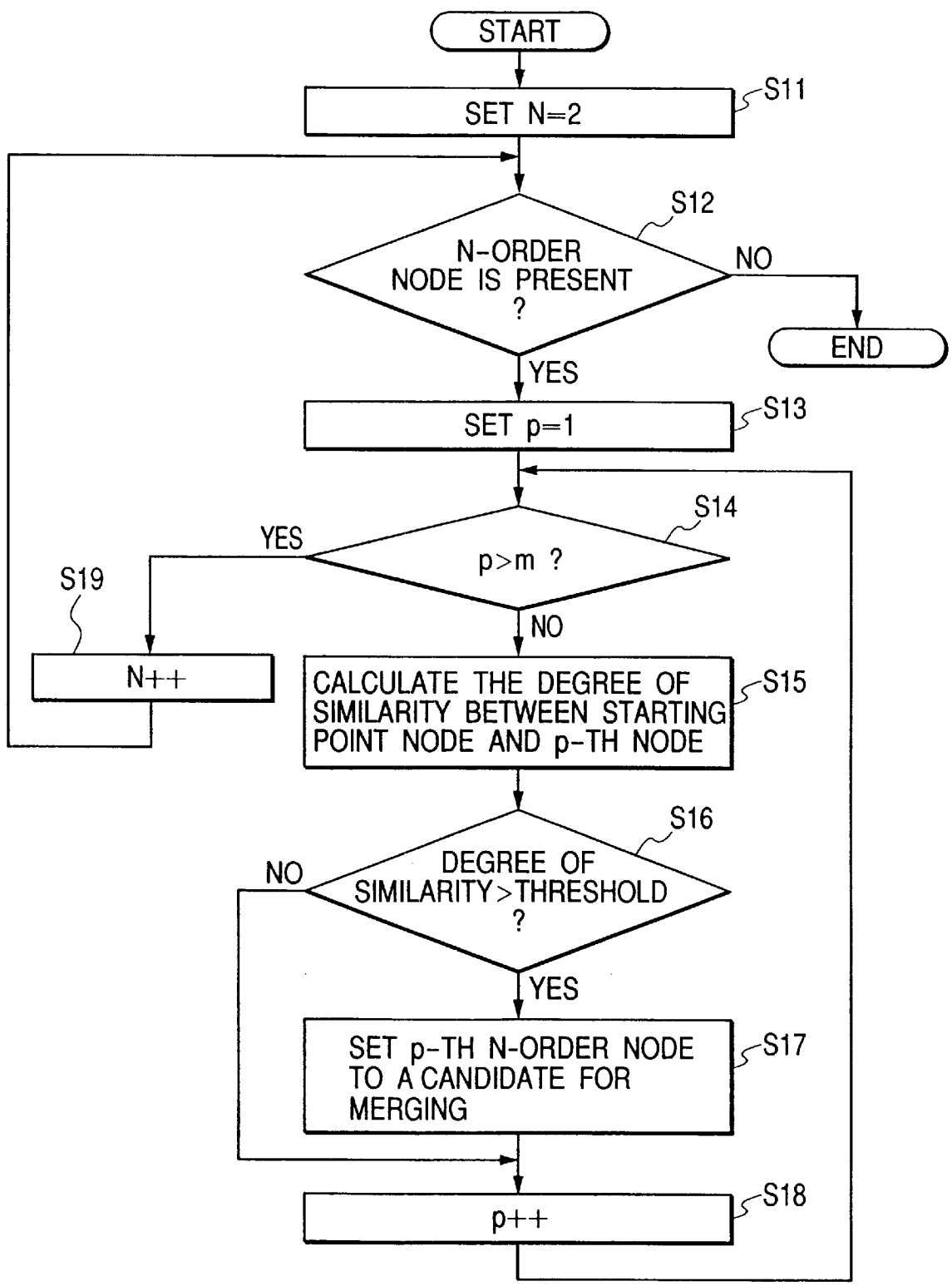
FIG. 4 is a flow-chart showing the flow of a similarity determination process.

FIG. 4 is a flow-chart showing a flow of the similarity determining process. This process is all performed by the similarity determining unit 114.

[S11] Initialization of N=2 is performed.

[S12] Whether or not the N-order node is present is determined. If it is present, the process proceeds to a step S13, and otherwise, the process is terminated.

[S13] Initialization of p=l is performed. Also, a number of the N-order nodes is assumed to be m.

[S14] p is compared with m in size, and if p>m, the process proceeds to a step S19, and otherwise, it proceeds to a step S15.

[S15] The degree of similarity between the starting point node and the p-th N-order node will be calculated using the above-described method (known vector inner product operation method).

[S16] The value of degree of similarity obtained in the step S15 is compared with the threshold, and if the degree of similarity >threshold, the process proceeds to a step S17, and otherwise, it proceeds to a step S18. The threshold here is a predetermined value, and the tolerance of the similarity is adjusted by its size.

[S17] The p-th N-order node is stored as a candidate for a node which merges with the starting point node.

[S18] 1 is added to the value of p, and the process proceeds to a step S14.

[S19] 1 is added to the value of N, and the process proceeds to a step S12.

Thus, nodes having contents similar to the starting point node are extracted from among all nodes accessible by following the links from the starting point node, or all nodes accessible up to a predetermined depth.

Let us consider a case where a node group is constituted with the starting point node 11 as a starting point (see FIG. 2) In this respect, links are stretched to two secondary nodes 12 and 13 from the starting point node 11. Links are also stretched to other nodes from the secondary nodes 12 and 13, and finally links are stretched to nodes 14 to 16.

When the starting point node 11 is inputted into the node group constituting part 110, the contents of the starting point node 11 are analyzed by the starting point node feature extraction unit 111, and the feature of the starting point node 11 is supplied to the similarity determining unit 114 as a starting point node feature profile. Also, the related node acquisition unit 112 extracts names of node paths for the secondary nodes 12 and 13 to which links are stretched from the starting point node 11, and acquires the secondary nodes 12 and 13. By further following the links from the secondary nodes 12 and 13, all accessible nodes are acquired up to N-order nodes 14 to 16. The nodes acquired are supplied to the related node feature extraction unit 113. The related node feature extraction unit 113 extracts the features of the contents of each node to prepare related node feature profiles. Then, the similarity determining unit 114 extracts all related nodes having the contents similar to the node 11. Thus, all extracted nodes are caused to merge with the starting point node by the node merging unit 115 to generate merged nodes.

All nodes accessible by following the links from the starting point node, or all nodes accessible up to a predetermined depth as well as the secondary nodes to which links are directly stretched from the starting point node are thus set to objects to be judged in terms of the similarity, whereby all of those can be handled as an object to be retrieved in terms of information as one grouping even if the document author may prepare a multi-level hyper-document.

The process up to here is executed in advance before a retrieval request is given by the user. Thereafter, when the retrieval request is inputted, the information retrieval part 130 generates a retrieval request profile. The detail of the retrieval request profile generating process is the same as the process shown in the flow-chart of FIG. 3. The information retrieval part 130 calculates the degree of similarity between the retrieval object profile in the retrieval object profile storing unit 116 and the retrieval request profile, and a set consisting of the identification address of a starting point node corresponding to a retrieval object profile having a high degree of similarity and the value of degree of similarity is sent to the similarity calculation part 140 as a result of the retrieval. At this time, the retrieval request profile is also sent to the similarity calculation part 140.

Next, the detail of the similarity calculation part 140 will be described.

Figure 5:
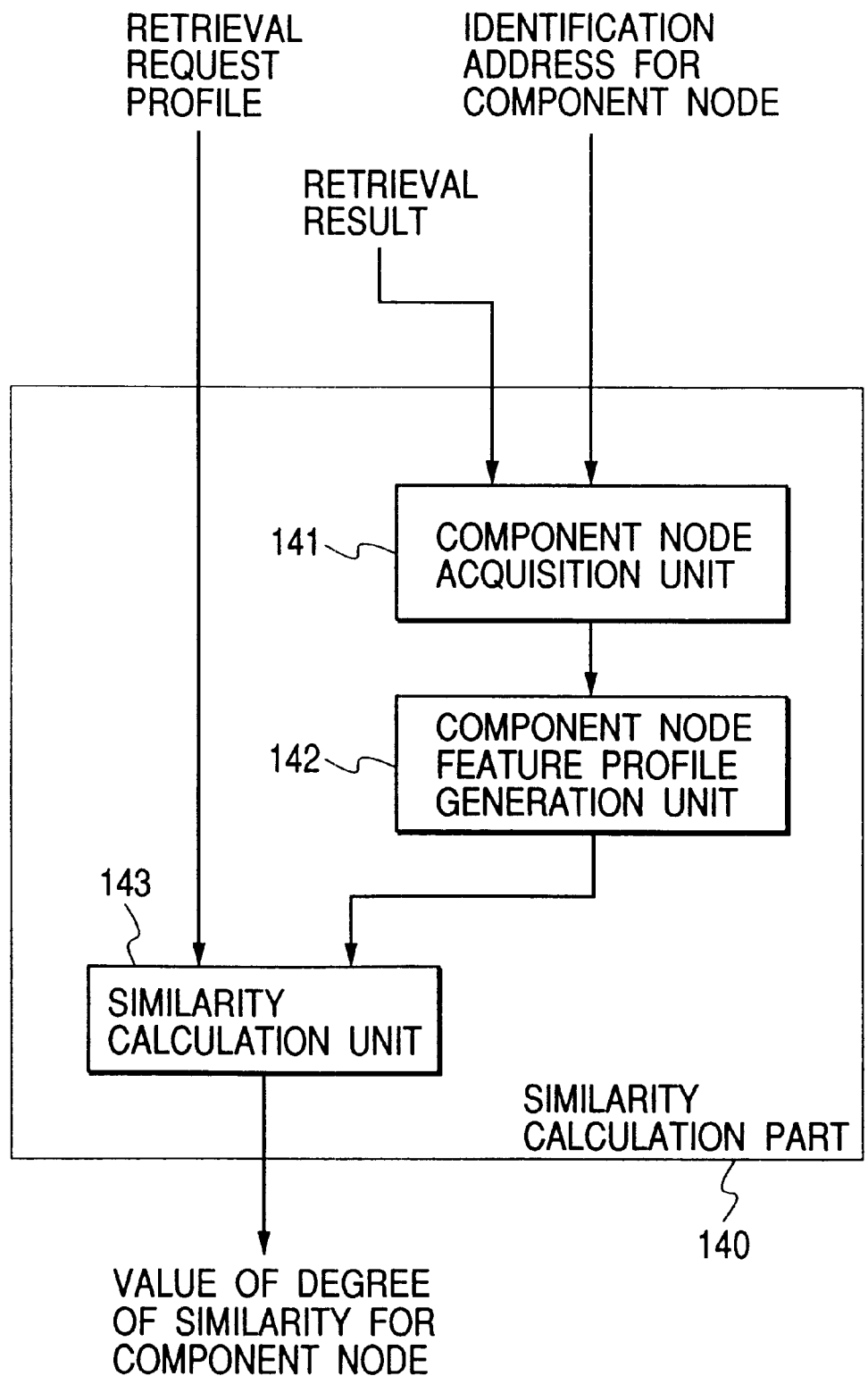
FIG. 5 is a view showing the internal structure of a similarity calculation part.

FIG. 5 is a view showing the internal structure of the similarity calculation part. The similarity calculation part 140 is composed of a component node acquisition unit 141, a component node feature profile generating unit 142, and a similarity calculating unit 143.

On receipt of the identification address for the starting point node of a node group obtained as the retrieval result, the component node acquisition unit 141 acquires the identification address for a component node corresponding to the identification address of the starting point node from the component node storing part 120. The identification address for the component node is the identification address for each node constituting the node group returned as the retrieval result. The component node acquisition unit 141 acquires a node indicated by the identification address of the component node from the hyper-document system 10.

The component node feature profile generating unit 142 generates a profile (hereinafter, referred to as "component node profile") representing the feature of the contents of a node acquired at the component node acquisition unit 141. The detail of the component node profile generation process is the same as the process shown in the flow-chart of FIG. 3.

The similarity calculation unit 143 receives a retrieval request profile generated by the information retrieval part 130, and calculates the value of degree of similarity between the retrieval request profile received and the component node profile using the vector inner product operating method. The calculation result is inputted into the similarity retrieval result displaying part 150.

The similarity retrieval result displaying part 150 displays the structure of node groups similar to the retrieval request so as to clarify access paths to component nodes having high degrees of similarity.

Figure 6:
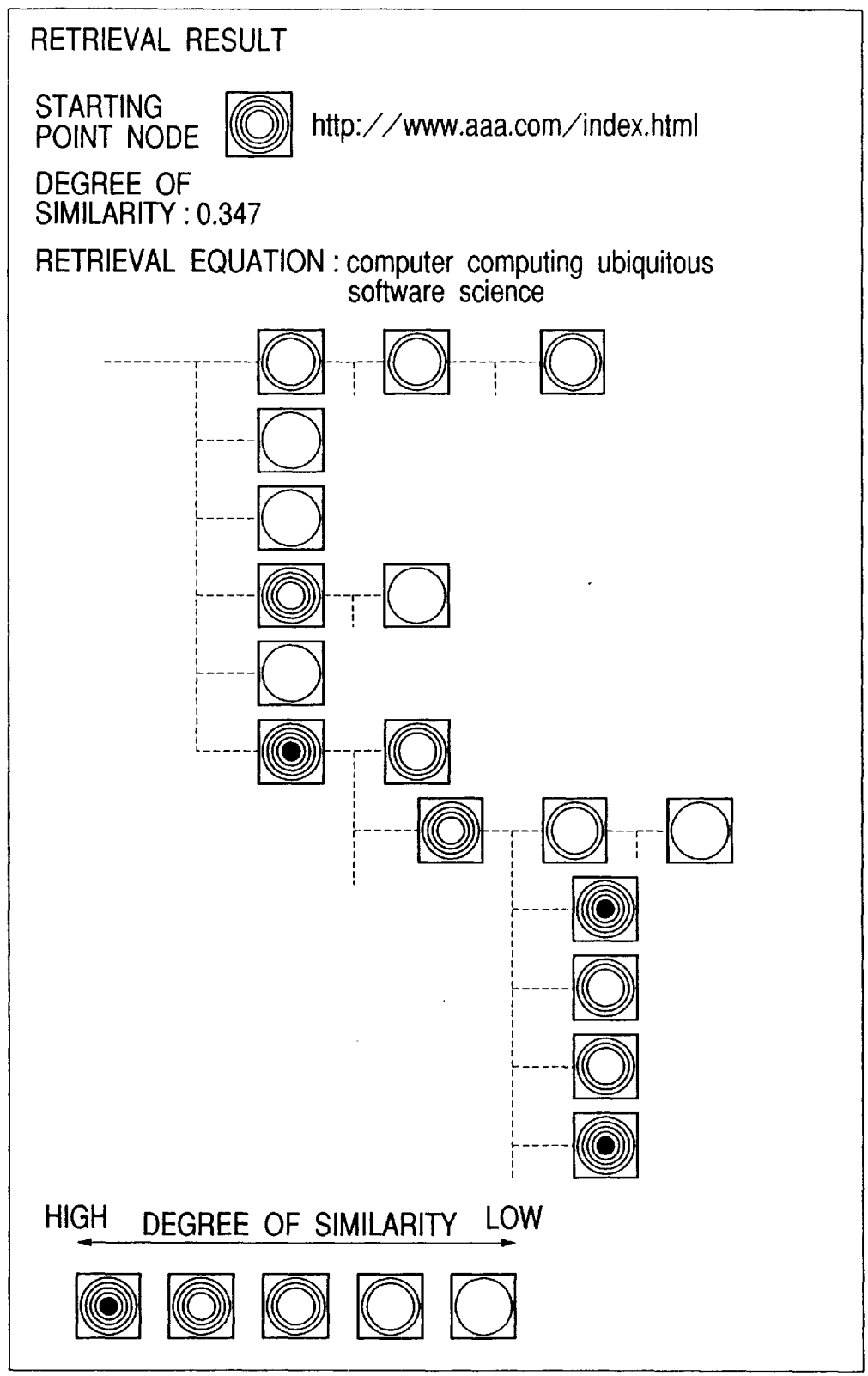
FIG. 6 is a view showing an example of display using a similarity retrieval result displaying part.

FIG. 6 is a view showing an example of display using the similarity retrieval result displaying part. This view shows the structure of a node group most similar to the retrieval request. Rectangles in the figure represent component nodes. The number of circles within the rectangle indicates a degree of similarity between the component node and the retrieval condition. In this example, the degrees of similarity of the component nodes are divided into five stages for displaying.

The user can recognize at a glance which component node has a high link between the component node and the retrieval condition by seeing such a screen.

In this respect, in the above-described description, the degree of similarity of the component node has been calculated for all node groups similar to the retrieval condition, but it may be possible to calculate the degree of similarity only for node groups designated by the user from among node groups returned as the retrieval result.

Next, the description will be made of a second embodiment according to the present invention. In the second embodiment, when a plurality of node groups have been obtained as retrieval result by the information retrieval part, calculation of degree of similarity between a component node contained in two or more node groups and the retrieval request is caused not to be duplicated.

Figure 7:
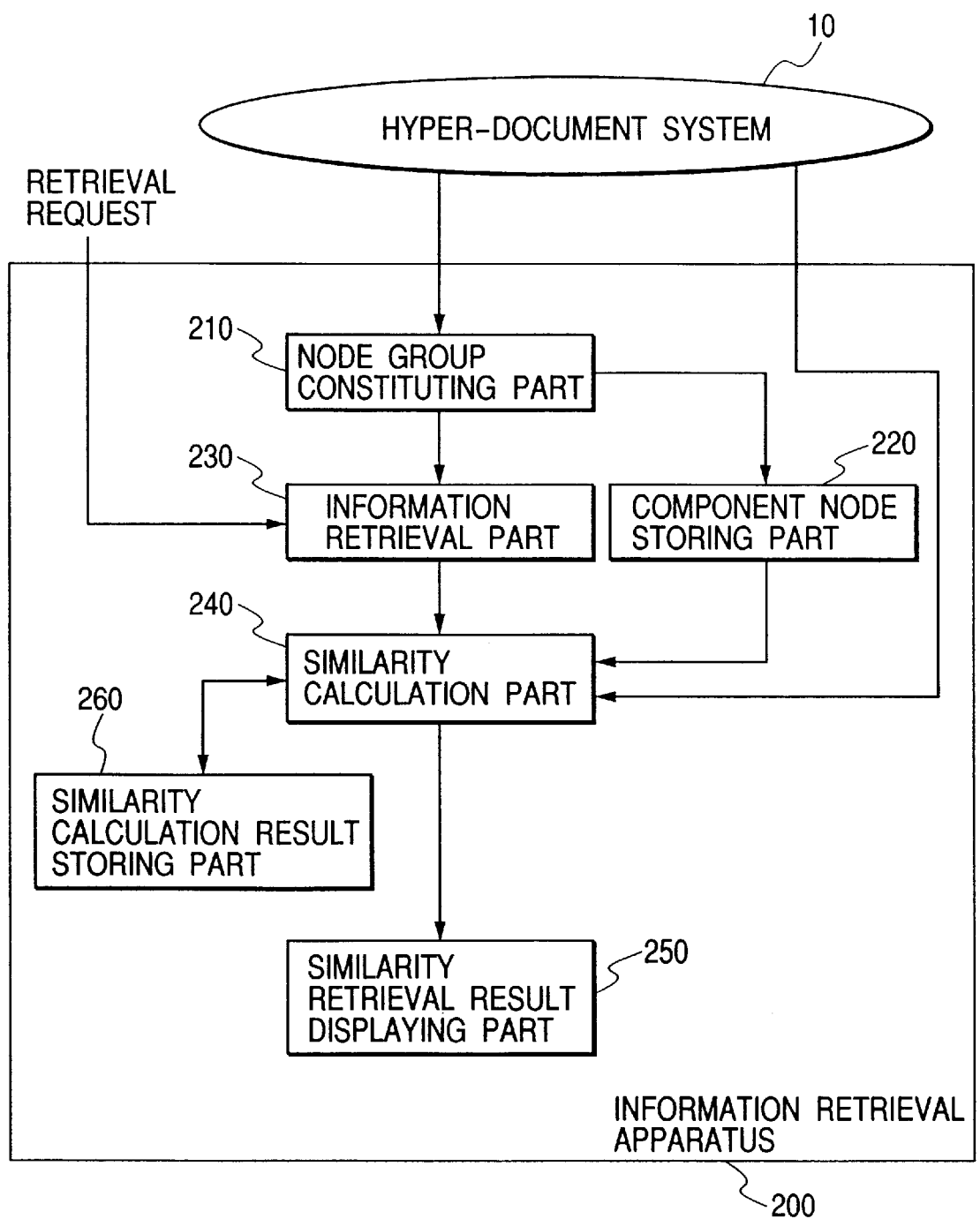
FIG. 7 is a view showing a second embodiment of information retrieval apparatus.

FIG. 7 is a view showing a second embodiment of information retrieval apparatus. In this respect, a node group constituting part 210, a component node storing part 220, an information retrieval part 230, and a similarity retrieval result displaying part 250 in this information retrieval apparatus 200 have the same functions as the components having the same names in the first embodiment shown in FIG. 1, and therefore, the description will be omitted.

A similarity calculation result storing part 260 newly added in the present embodiment stores the calculation result at a similarity calculation part 240 each time. In other words, it holds the degree of similarity for each node to the retrieval condition profile.

Figure 8:
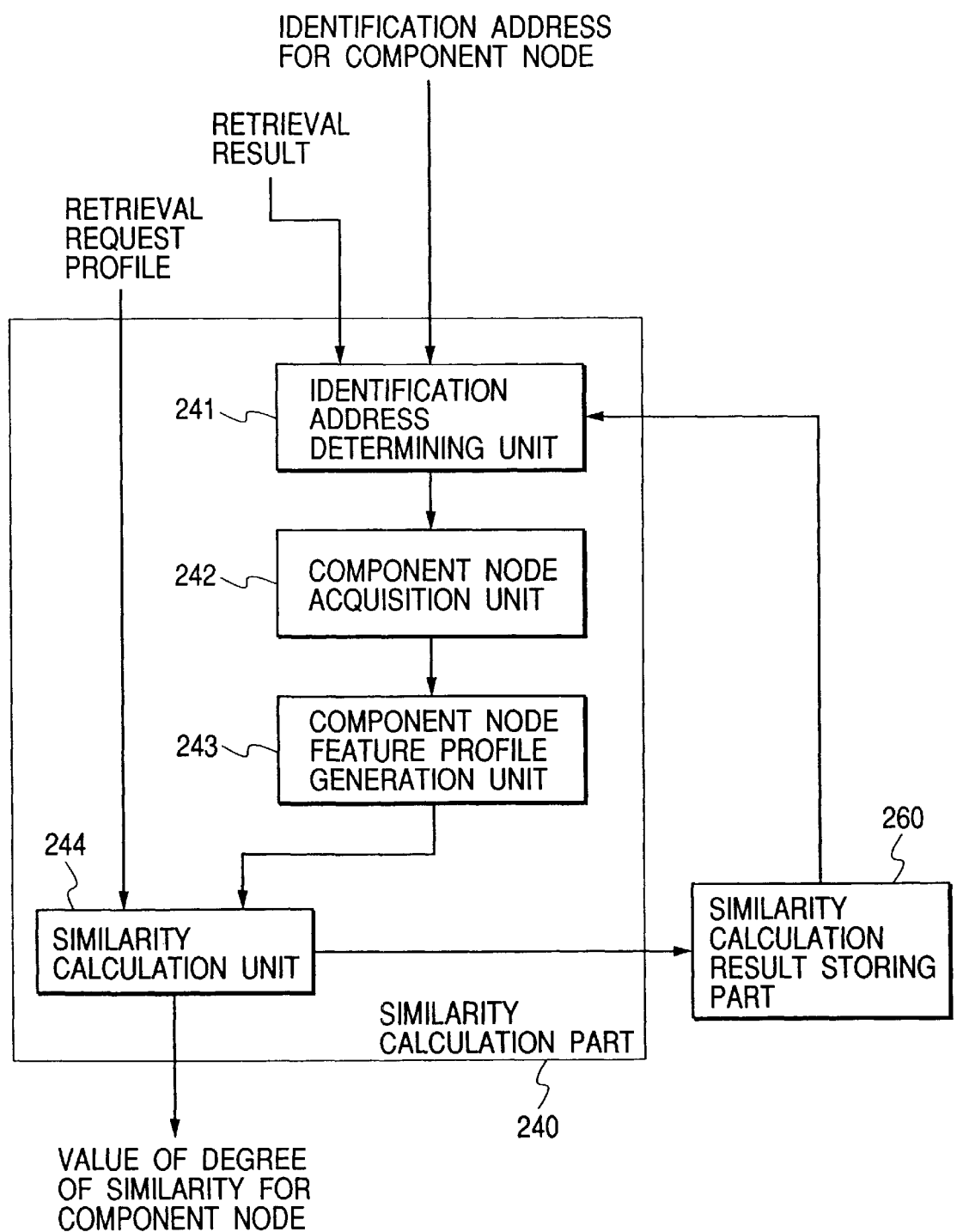
FIG. 8 is a view showing the structure of a similarity calculation part according to the second embodiment.

The similarity calculation part 240 in the present embodiment is composed of such elements as shown in FIG. 8.

FIG. 8 is a view showing the structure of the similarity calculation part according to the second embodiment. To this similarity calculation part 240, there are inputted the retrieval request profile and the retrieval result from the information retrieval part 230. As the retrieval result, it is assumed here that the identification addresses for the starting point node in the node group, whose degree of similarity exceeds the threshold, are inputted in order of decreasing degree of similarity.

When the retrieval result (a plurality of starting point node identification addresses) is inputted, an identification address determining unit 241 acquires a component node identification address corresponding to the first starting point node identification address shown in the retrieval result from the component node storing part 220. Further, the identification address determining unit 241 acquires similarity calculation result corresponding to a set consisting of the retrieval request profile and the component node identification address from the similarity calculation result storing part 260 to input its value to the similarity retrieval result displaying part 250. In this case, if any similarity calculation result corresponding to a set consisting of the retrieval request profile and the identification address is absent in the similarity calculation result storing part 260, the component node identification address will be inputted into the component node acquisition unit 242.

When a component node identification address is inputted, the component node acquisition unit 242 acquires the contents of the node which the component node identification address shows from the hyper-document system 10, and supplies to a component node feature profile generation unit 243.

The component node feature profile generation unit 243 generates a component node profile representing the feature of the contents of a node acquired in the component node acquisition unit 242.

A similarity calculation unit 244 calculates a value of degree of similarity between the retrieval request profile and the component node profile, and inputs the result into the similarity retrieval result displaying part 250 and the similarity calculation result storing part 260.

According to such an information retrieval apparatus, the degrees of similarity of nodes constituting the node group of the retrieval result obtained by calculating at the similarity calculation unit 244 are held by the similarity calculation result storing part 260. The retrieval result for a certain retrieval request here means a plurality of node groups ranked in order of decreasing degree of similarity. For this reason, there also exist nodes which are contained in two or more node groups. Once the degree of similarity between such nodes and the retrieval request is calculated, the calculation result is stored in the similarity calculation result storing part 260, and thereafter, the calculation result can be only extracted from the similarity calculation result storing part 260. Accordingly, duplicated calculations for one node can be avoided to enhance the processing efficiency.

The description will be made of a third embodiment. The third embodiment displays the structure of a node group in such a manner that the user can easily follow links between nodes. In this respect, the components necessary for an information retrieval apparatus according to the third embodiment are the same as in the first embodiment. For this reason, the structure shown in FIGS. 1 and 2 will be used, and only the contents of processing different from the first embodiment will be described.

The node group constituting part 110 constitutes node groups as in the case of the first embodiment, and at this time, the identification address for a node, which is referred to by a link as a profile for each node, is held in the component node storing part 120 as a referenced node table. Also, the identification address for a node which refers to by itself is also held in the component node storing part 120 as a reference node table.

Next, when a retrieval request is given, retrieval is performed by the information retrieval part 130 as in the case of the first embodiment, and node groups having contents similar to the retrieval request are extracted. Further, the similarity calculation part 140 calculates the degree of similarity between each node constituting the node group extracted and the retrieval request, and is sent to the similarity retrieval result displaying part 150. At this time, the referenced node table and the reference node table for each node which are held in the component node storing part 120 are sent to the similarity retrieval result displaying part 150.

Figure 9:
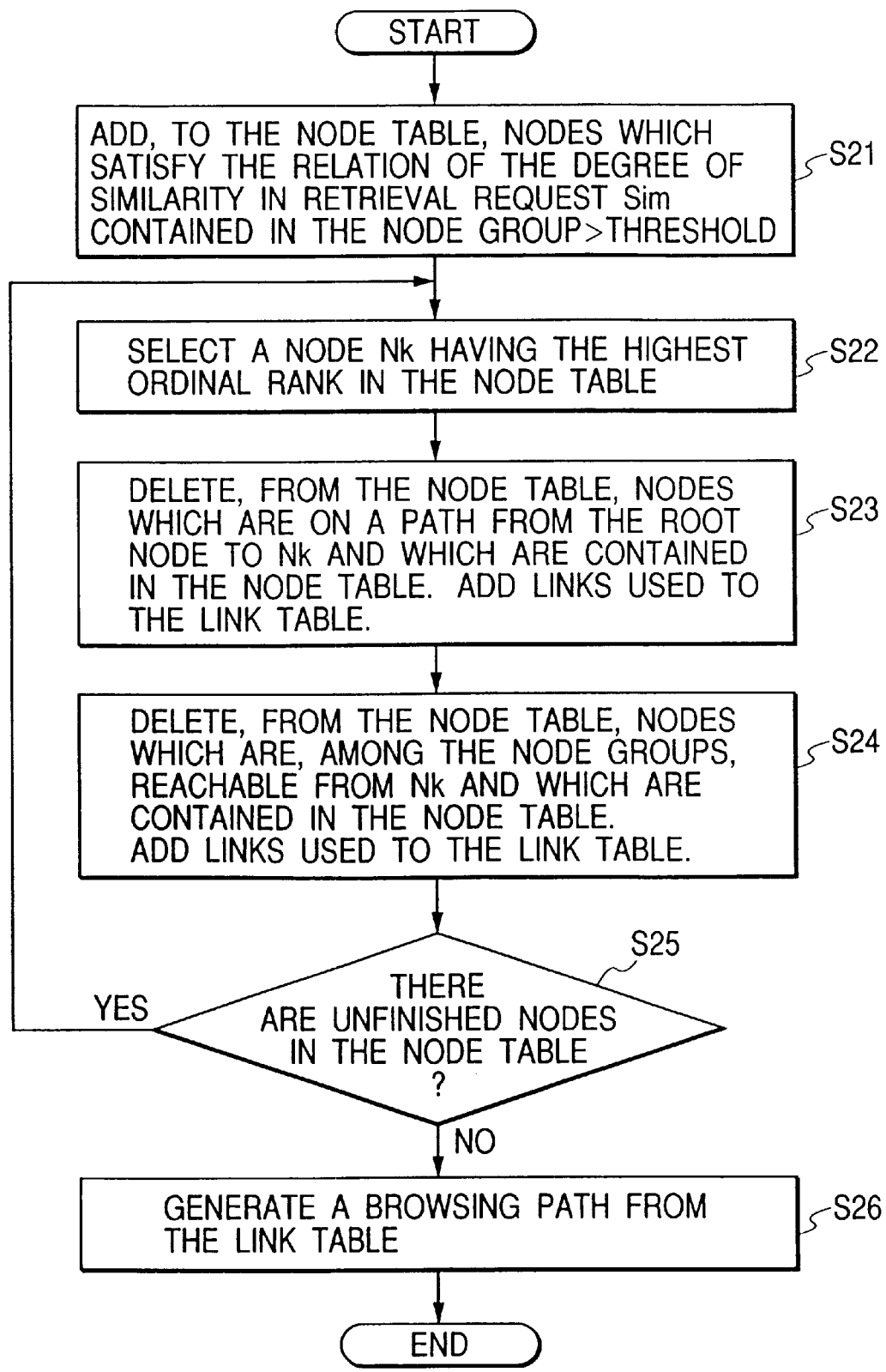
FIG. 9 is a view showing operating procedures of a similarity retrieval result displaying part in a third embodiment.

On reception of the node group, the value of degree of similarity for the component node, the referenced node table for the component node and the reference node table for the component node, the similarity retrieval result displaying part 150 performs the following processes:

FIG. 9 is a view showing processing procedures by the similarity retrieval result displaying part according to the third embodiment. In this respect, the following processes are all performed by the similarity retrieval result displaying part, and are executed when node groups added with the value of similarity are inputted from the similarity calculation part.

[S21] Nodes which satisfy the relation of the degree of similarity in retrieval request Sim contained in the node group >threshold are added to the node table.

[S22] A node NK having the highest ordinal rank in the node table is selected.

[S23] A path from the root node of the node group to Nk is determined from the reference link table for each component node, and nodes which are on the path and are contained in the node table are deleted from the node table. Also, links used at this time are added to the link table.

[S24] Nodes which are, among the node groups, reachable from Nk are determined from the reference node table for each component node, and nodes among them which are contained in the node table are deleted from the node table. Also, links used at this time are added to the link table.

[S25] Whether or not there are unfinished nodes in the node table is determined. If there are unfinished nodes in the node table, the process proceeds to a step S22, and otherwise, it proceeds to a step S26.

[S26] A browsing path (access path to a component node having a high degree of similarity) is generated from the link table.

In this manner, a browsing path for a node group having a high degree of similarity to the retrieval request is generated. The browsing path thus generated is effective on perusing in order from a node having a higher degree of similarity to the retrieval equation.

Hereinafter, the description will be made of an example of display for a node group according to the third embodiment in comparison with the example of display for the node group according to the first embodiment.

Figure 10:
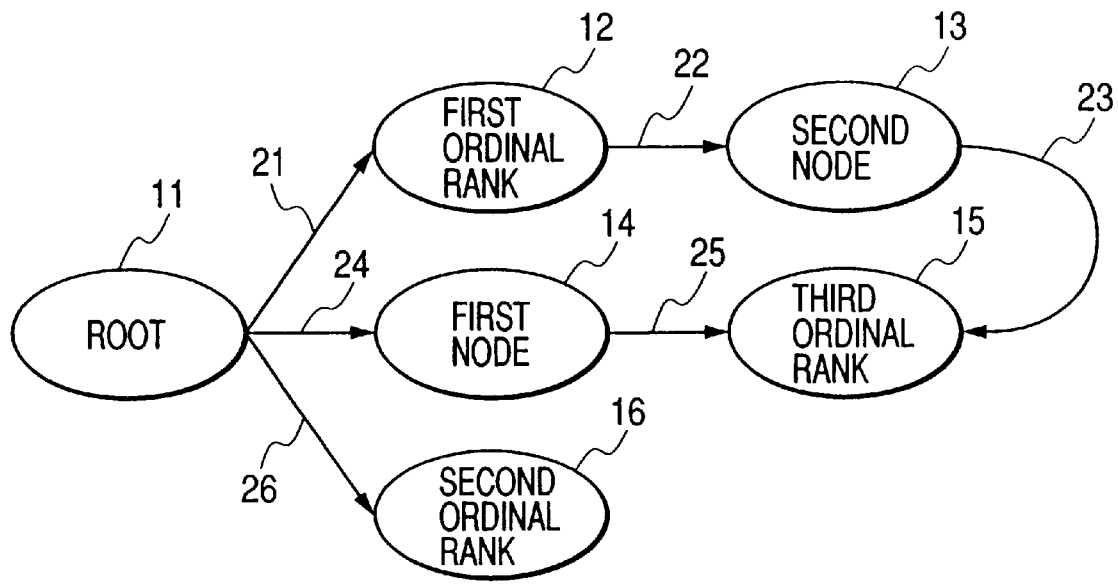
FIG. 10 is a view showing an example of node groups extracted by an information retrieval part.

FIG. 10 is a view showing an example of a node group extracted by the information retrieval part. In the node group shown in this example, there exist six nodes 11 to 16 as component nodes. A node 11 indicated as "root" is a starting point node. Also, three nodes 12, 15 and 16 exceed the threshold of the degree of similarity in retrieval request. The node 12 with the wording "first ordinal rank" is a node having the highest degree of similarity, the node 16 with the wording "second ordinal rank" is a node having the second highest degree of similarity, and the node 15 with the wording "third ordinal rank" is a node having the third highest degree of similarity. Arrows connecting between each node 11 to 16 designate links 21 to 26. As shown in FIG. 10, there are two paths along which the node 15 having the third degree of similarity is reached by following the links from the root node 11.

When such a node group is inputted into the similarity retrieval result displaying part according to the third embodiment, the following processes are performed in accordance with the flow-chart of FIG. 8.

First, nodes of "first ordinal rank", "second ordinal rank" and "third ordinal rank" are stored in the node table (step S21). Next, the node 12 of the "first ordinal rank" is selected from the node table (step S22), a link 21 from the "root" node 11 to the node 12 of the "first ordinal rank" is stored in the link table, and the node 12 of the "first ordinal rank" is deleted from the node table (step S23). Next, the node of the "third ordinal rank", which is a node reachable from the node of the "first ordinal rank", is deleted from the node table, and the link 22 and the link 23 are added to the link table (step S24).

Thereafter, since nodes are still contained in the node table, the link 21, the link 22, the link 23, and the link 26 are registered in the link table by repeating the same process again. A browsing path is presented to the user in accordance with this link table registered.

Figure 11:
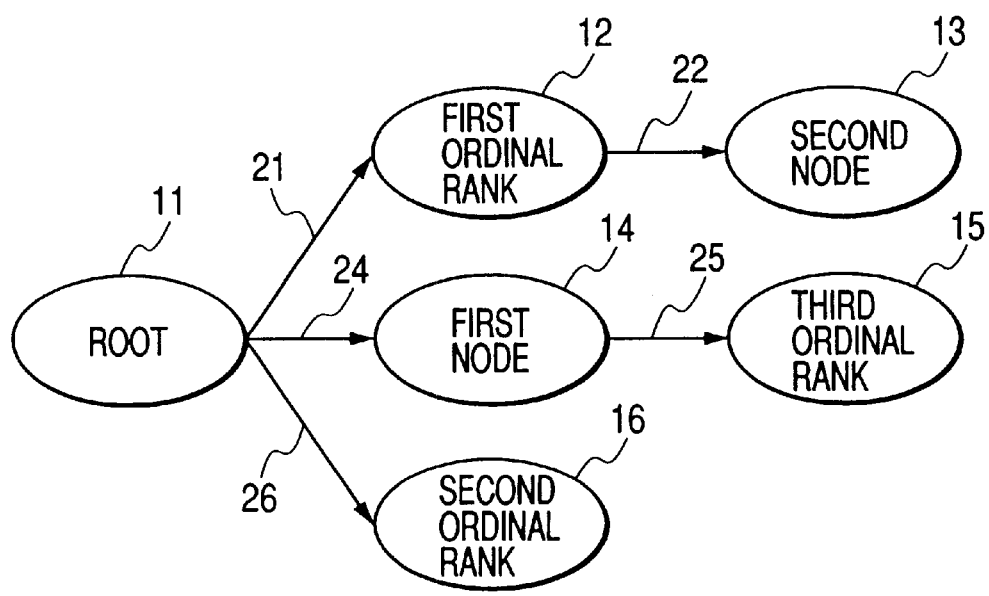
FIG. 11 is a view showing node groups displayed in the first embodiment.
Figure 12:
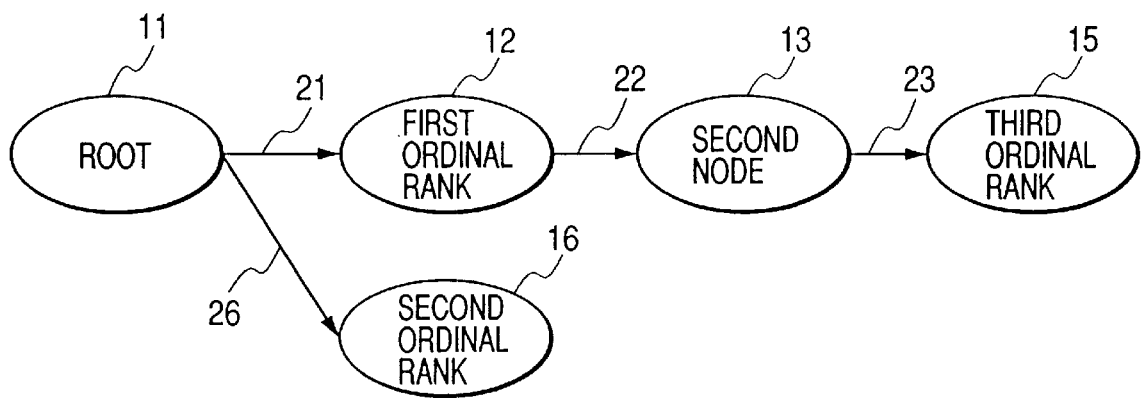
FIG. 12 is a view showing node groups displayed in the third embodiment.

Differences in the contents of display between the first embodiment and the third embodiment are shown in FIGS. 11 and 12.

FIG. 11 shows a node group displayed in accordance with the first embodiment. In the first embodiment, paths for following from the root node are shown as shown in FIG. 11.

FIG. 12 is a view showing a node group displayed in accordance with the third embodiment. In the third embodiment, the paths will be indicated if the links can be followed from a node having higher degree of similarity to a node having lower degree of similarity as shown in FIG. 12. Accordingly, links 22 and 23 from the node 12 of the "first ordinal rank" to the node 15 of the "third ordinal rank" are displayed, and a link along which the node 15 of the "third ordinal rank" is reached from the "root" node 11 by way of the first node is not displayed.

In comparison with the displayed contents according to the first embodiment, a browsing path according to the third embodiment has less nodes to be referred to from the node, which serves as the starting point of the node group, and a linear browsing path is shown. Thus, there is no need for the path being followed by the user again, but information on the node having high degree of similarity to the retrieval request can be effectively obtained.

The description will be made of a fourth embodiment. The fourth embodiment constitutes a node group by reflecting the contents of the retrieval request.

Figure 13:
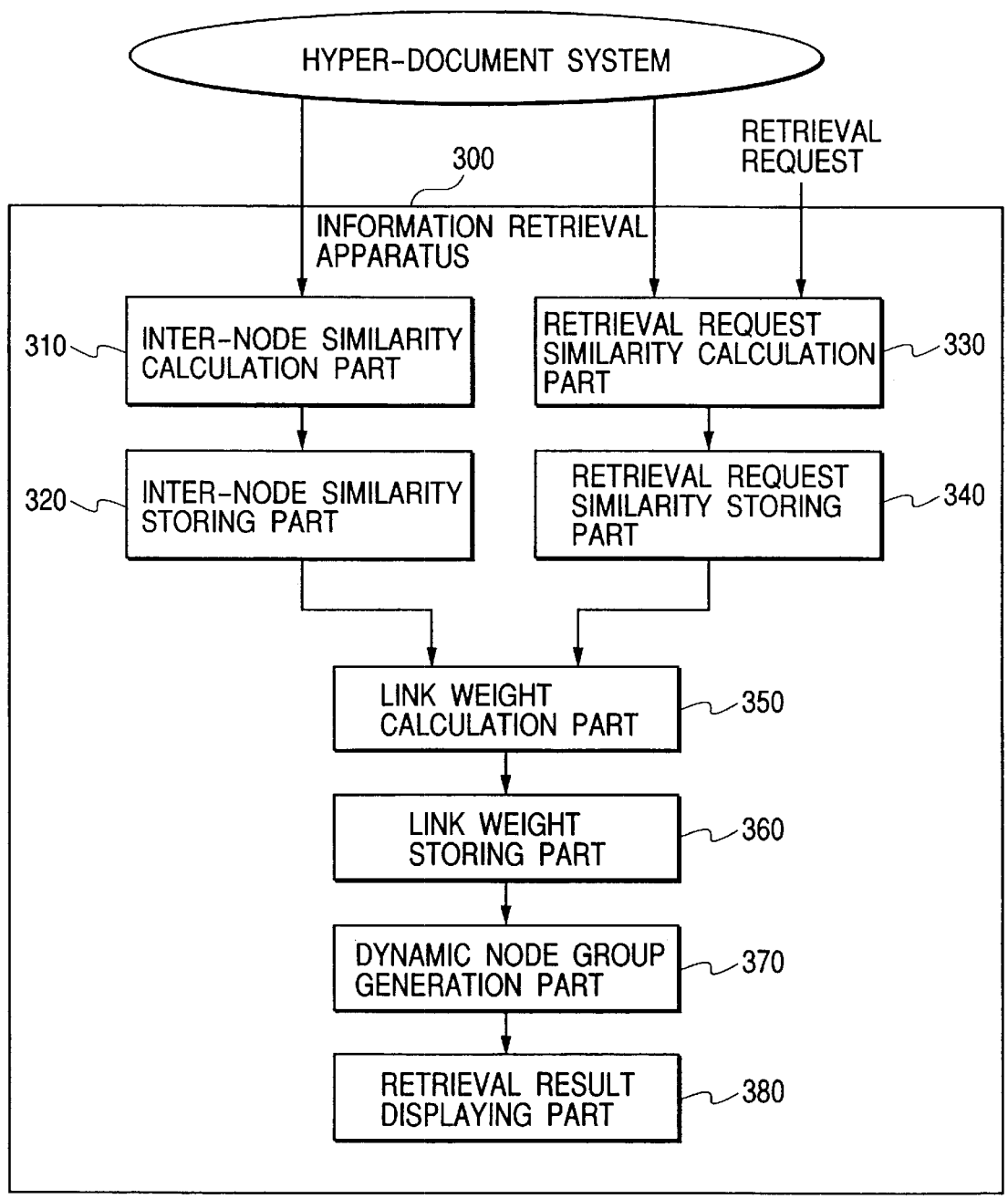
FIG. 13 is a view showing the structure of a fourth embodiment of information retrieval apparatus.

FIG. 13 is a view showing the structure of an information retrieval apparatus according to the fourth embodiment. An information retrieval apparatus 300 according to the fourth embodiment is composed of the following elements:

An inter-node similarity calculation part 310 calculates a degree of similarity between nodes which are two pieces of information connected through a link from information dispersedly arranged in the hyper-document system 10. The similarity calculation process is the same as the process performed by the similarity determining unit 114 of FIG. 2. At this time, in a "node A" and a "node C", a degree of similarity between the nodes connected through a link in the form of reference from the "node A" to the "node C" is represented by Sim(A, C). An inter-node similarity storing part 320 stores an inter-node degree of similarity calculated by the intern ode similarity calculation part.

A retrieval request similarity calculation part 330 calculates degrees of similarity between a retrieval request profile generated from a retrieval request and nodes representing individual pieces of information dispersedly arranged in the hyper-document system. The similarity calculation process is the same as the process performed by the similarity calculation unit 143 (shown in FIG. 5) according to the first embodiment. At this time, a degree of similarity between the "node C" and the retrieval request is represented by Sim (Q, C) . A retrieval request similarity storing part 340 stores the retrieval request similarity calculated by the retrieval request similarity calculation part 330.

A link weight calculation part 350 calculates link weight, which is weight of a link between nodes, from the degree of similarity in retrieval request and the inter-node degree of similarity.

Figure 14:
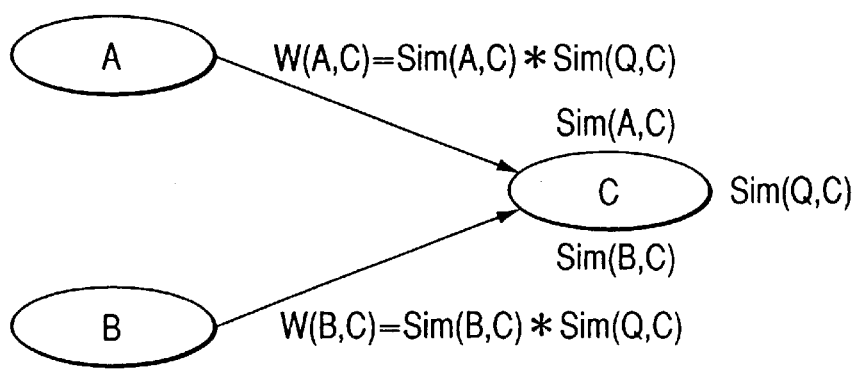
FIG. 14 is a view showing an example of calculation of link weight between nodes using a link weight calculation part.

FIG. 14 is a view showing an example of calculation for link weight between nodes by the link weight calculation part. When the "node C" is referred to from the "node A" and the "node C" is referred to from the "node B" as shown in FIG. 14, weight of link between "node A" and "node C", and weight of link between "node B" and "node C" are calculated by W(A, C) Sim(A, C)×Sim(Q, C) and W(B, C)=Sim(B, C)×Sim(Q, C) respectively.

All link weight between nodes in the hyper-document system 10 can be calculated by the foregoing. In this respect, as regards the degree of similarity between nodes, it can also be stored by calculating in advance because it does not vary depending on the retrieval request from the user.

A link weight storing part 360 stores link weight obtained by calculating by the link weight calculation part 350.

A dynamic node group generation part 370 generates a node group connected through link weight equal to or higher than a certain threshold on the basis of the link weight. The detail of this process will be described with reference to FIG. 15.

A retrieval result displaying part 380 displays a dynamic node group generated by the dynamic node group generation part 370 on the screen of a display unit.

The dynamic node group generating process will be described in detail hereinafter. In this respect, the following process is a process which will be performed until all nodes, whose degree of similarity is equal to or higher than a certain threshold, are contained in any of the node groups, and during the period of time, the existing node tables are used in common.

Figure 15:
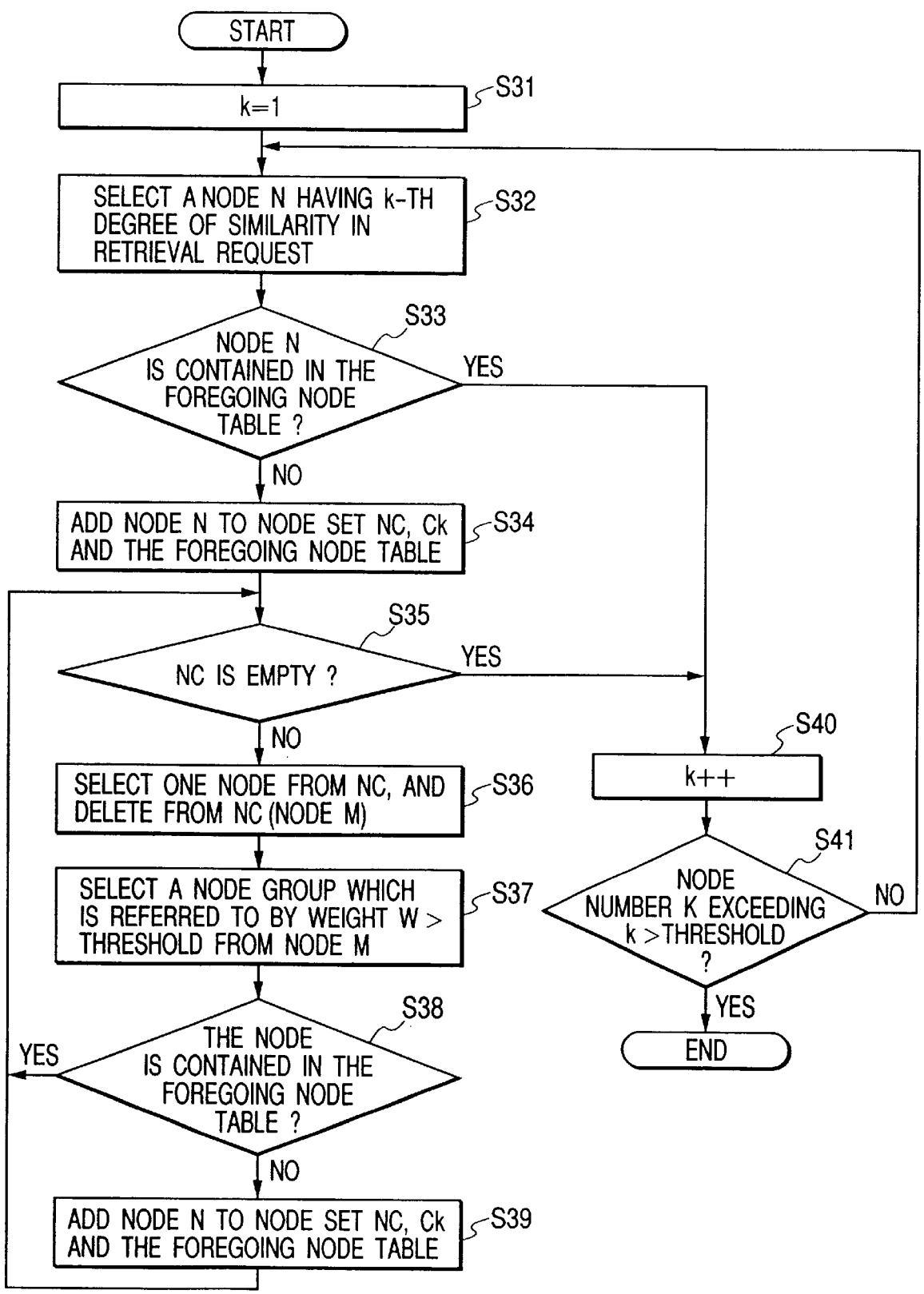
FIG. 15 is a flow-chart showing the procedure of a dynamic node group generation process.

FIG. 15 is a flow-chart showing procedures of the dynamic node group generating process. This process is all performed by the dynamic node group generation part 370.

[S31] The initial value of k value is set to 1.

[S32] A node N, whose degree of similarity in retrieval request is k-th, is selected.

[S33] Whether or not the node N is contained in the existing node table is determined. If it is contained in the existing node table, the process proceeds to a step S40, and otherwise, it proceeds to the step S34.

[S34] The node N is added to the node set NC, the node set Ck, and the existing node table.

[S35] Whether or not the node set NC is empty is determined. If it is empty, the process proceeds to the step S40, and otherwise, it proceeds to a step S36.

[S36] One node is selected from the node set NC, and is deleted from the NC. The node selected here is set to a node M.

[S37] A node group referred to by the relation of "weight W >threshold" is extracted from the node M.

[S38] Whether or not each node extracted at a step S37 is contained in the existing node table is determined. If it is contained in the existing node table, the process proceeds to the step S35, and otherwise, it proceeds to a step S39.

[S39] The node extracted at the step S37 is added to the node set NC, the node set Ck and the existing node table, and the process proceeds to the step S34.

[S40] 1 is added to the k value.

[S41] Whether or not the k value exceeds the total number K of nodes whose degree of similarity in retrieval request exceeds the threshold is determined. If the degree of similarity in retrieval request exceeds the total number K of nodes, which exceeds the threshold, the process will be terminated, and otherwise, it proceeds to the step S32.

Such a process is performed for all nodes whose degree of similarity in the retrieval request is equal to or higher than a certain threshold to thereby generate a plurality of node sets Ck. The contents of this process will be described using a concrete example.

Figure 16:
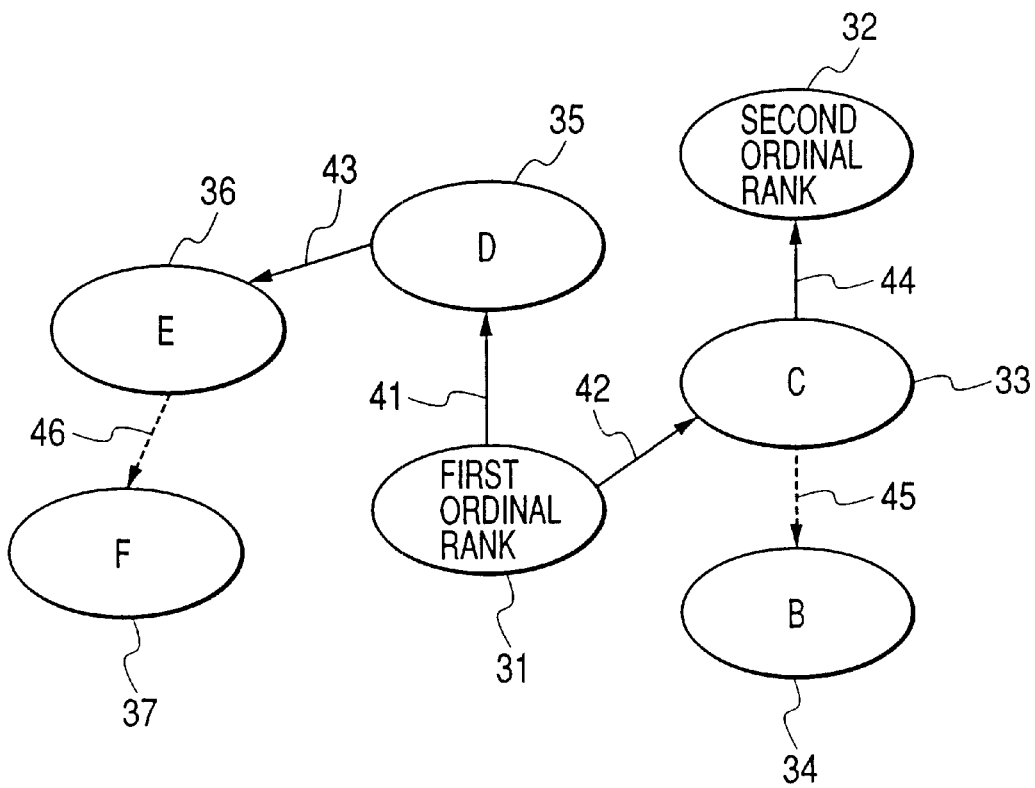
FIG. 16 is a view showing a part of information in the hyper-document system.

FIG. 16 is a view showing a part of information in the hyper-document system. In FIG. 16, nodes 31 and 32 with the wording "first ordinal rank" and "second ordinal rank" respectively are a node with the highest degree of similarity to the retrieval request and a node with the second highest degree respectively. Arrows indicated by solid lines connecting between 31 to 36 represent links 41 to 44 having weight equal to or higher than the threshold, and arrows indicated by broken lines represent links 45 and 46 having weight equal to or lower than the threshold.

First, the node 31 of the "first ordinal rank" having the highest degree of similarity to the retrieval request is selected, and the process is performed with the node 31 as a starting point in accordance with the flow-chart of FIG. 15. Whether or not the node 31 is contained in the existing node table is determined, but since nothing has been registered in the existing node table at this stage, the node 31 of the "first ordinal rank" is added to the node set NC, C1 and the existing node table respectively. The node 31 of the "first ordinal rank" is taken out from the node set NC, and nodes 33 and 35, to which this node refers, and whose weight exceeds the threshold, are added to the node set NC, C1 and the existing node table. Next, this operation is likewise repeated for the nodes 33 and 35 which are contained in the node set NC, and is repeated until the node set NC becomes empty. In this example, the node 31 of the "first ordinal rank", the node 32 of the "second ordinal rank", the node 33 and the node 35 are placed in the node set C1 to terminate the process.

Next, as "k=2", a process with the node 32 of the "second ordinal rank" as the starting point is started, and the node 32 has already been contained in the existing node table. For this reason, the node set C2 is not prepared, but the process proceeds to a process with the node of the "third ordinal rank" as the starting point. Similarly hereinafter, the generation process for a node set is repeated until all nodes exceeding the threshold which has been given in advance are contained in any of the node set Ck.

Figure 17:
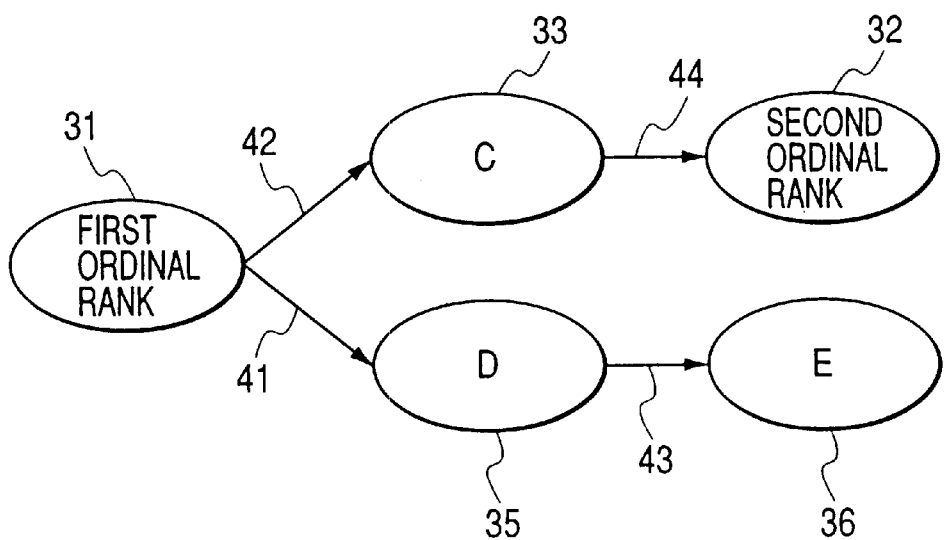
FIG. 17 is a view showing an example of display of node groups constituted in accordance with a retrieval request.

FIG. 17 shows an example of a node group displayed on the basis of the node set C1 thus obtained.

FIG. 17 is a view showing an example of display of a node group constituted in response to the retrieval request. This example is an example of display of a node group constituted with the node 31 most similar to the retrieval request as the starting point. As shown in the figure, a node group is constituted by nodes which are connected with the weight exceeding the threshold.

In this manner, with the information divided into nodes in accordance with the document author's taste as meaningful consistence in which the user's interest is reflected, a node group is generated and is retrieved, and it becomes possible to provide a browsing path as the retrieval result. As a result, the information can be effectively perused.

In this respect, the above-described processing function can be implemented by a computer. In this case, the contents of process by the functions, which the information retrieval apparatus should have, are described in a program recorded in a computer-readable recording medium in advance. This program is executed by a computer to thereby implement the above-described process by the computer. As the computer readable recording medium, there are a magnetic recording device, a semiconductor memory and the like. In the case of putting them into circulation in the market, the program can be stored in a portable type recording medium such as a CD-ROM (Compact Disk Read Only Memory) and a floppy disk for distribution, and the program can be stored in the storage device of the computer connected via a network in advance and transferred to other computers through the network. On executing with the computer, the program is stored in a hard disk device or the like within the computer in advance and is executed by loading it into the main memory. Effect of the Invention As described above, an information retrieval apparatus according to the present invention has been constructed such that a degree of similarity between the component node for a node group similar to the retrieval request and the retrieval request is determined, and such that access paths for each component node are displayed in such a manner that component nodes having a high degree of similarity can be distinguished. Therefore, even in a case where retrieval, in which the information having meaningful consistence is handled as one unit, is implemented by means of a plurality of node sets, the user is capable of effectively referring to nodes which meet the intention of retrieval.

Also, in a computer-readable recording medium in which an information retrieval program according to the present invention has been recorded, by causing a computer to execute the information retrieval program recorded, it is possible to cause the computer to perform such a process as to determine a degree of similarity between the component node for a node group similar to the retrieval request and the retrieval request, and to display access paths for each component node in such a manner that component nodes having a high degree of similarity can be distinguished.

What is claimed is:

1. An information retrieval apparatus for retrieving a hyper-document system composed of links between nodes, which are units of information, comprising:

a node group constituting part that constitutes a node group comprising nodes, which are connected through links and are similar in contents with respect to nodes in said hyper-document system;

a component node storing part that stores component nodes constituting said node group;

an information retrieval part that retrieves, when a retrieval request is inputted, similar node groups having a high degree of similarity to said retrieval request among a plurality of said node groups;

a similarity calculation part that calculates degrees of similarity between the component nodes stored in said component node storing part and said retrieval request with respect to said similar node groups returned as a candidate as a result of the retrieval by said information retrieval part; and a similarity retrieval result displaying part that displays paths for accessing each component node in said similar node groups in such a manner that component nodes having a high degree of similarity to said retrieval request can be distinguished.

2. The information retrieval apparatus according to claim 1, further comprising a similarity calculation result storing part that holds similarity calculation result between said retrieval request and the component nodes, wherein said similarity calculation part acquires, from said similarity calculation result storing means, degrees of similarity between component nodes stored in said component node storing part and said retrieval request, and stores new degrees of similarity calculated in said similarity calculation result storing part successively.

3. The information retrieval apparatus according to claim 1, wherein said similarity retrieval result displaying part displays, if there exists an access path in descending order from a component node having a higher degree of similarity to a component node having a lower degree, said access path in descending order on a priority basis.

4. An information retrieval apparatus for retrieving a hyper-document system composed of links between nodes, which are units of information, comprising:

an inter-node similarity calculation part that calculates an inter-node degree of similarity between nodes, which are directly referred to by the links;

a retrieval request similarity calculation part that calculates, when a retrieval request is inputted, a degree of similarity in retrieval request between said retrieval request and the nodes contained in said hyper-document system;

a link weight calculation part that calculates link weight between the nodes on the basis of said degree of similarity in retrieval request and said inter-node degree of similarity; and a dynamic node group constituting part that constitutes a node group by nodes connected with one another by the link weight equal to or higher than a threshold set in advance on the basis of said link weight.

5. The information retrieval apparatus according to claim 4, further comprising a retrieval result displaying part that displays paths used to access each component node in a node group constituted with said node having a high degree of similarity in retrieval request as a starting point.

6. A computer-readable recording medium having an information retrieval program recorded therein, said information retrieval program retrieving a hyper-document system constituted by links between nodes, which are units of information, comprising:

a node group constituting part that constitutes a node group consisting of nodes, which are connected through links and are similar in contents, with respect to at nodes in said hyper-document system;

a component node storing part that stores component nodes constituting said node group;

an information retrieval part that retrieves, when a retrieval request is inputted, similar node groups having a high degree of similarity which meet said retrieval request among a plurality of said node groups;

a similarity calculation part that calculates degrees of similarity between the component nodes stored in said component node storing part and said retrieval request with respect to said similar node groups returned as a candidate as a result of the retrieval by said information retrieval part; and a similarity retrieval result displaying part that displays paths for accessing each component node in said similar node groups in such a manner that component nodes having a high degree of similarity to said retrieval request can be distinguished.

7. A computer-readable recording medium having an information retrieval program recorded therein, said information retrieval program retrieving a hyper-document system constituted by links between nodes, which are units of information, comprising;

an inter-node similarity calculation part that calculates an inter-node degree of similarity between nodes, which are directly referred to by the links;

a retrieval request similarity calculation part that calculates, when a retrieval request is inputted, degrees of similarity in retrieval request between said retrieval request and the nodes contained in said hyper-document system;

a link weight calculation part that calculates the link weight between the nodes on the basis of said degree of similarity in retrieval request and said inter-node degree of similarity; and;

a dynamic node group constituting part that constitutes a node group by nodes connected with one another by means of link weight equal to or higher than a threshold set in advance on the basis of said link weight.

\* \* \* \* \*